United States Patent [19]

Bäbler

[11] Patent Number: 5,584,922
[45] Date of Patent: Dec. 17, 1996

[54] STIR-IN ORGANIC PIGMENTS

[75] Inventor: Fridolin Bäbler, Hockessin, Del.

[73] Assignee: Ciba-Geigy Corporation, Tarrytown, N.Y.

[21] Appl. No.: 305,549

[22] Filed: Sep. 14, 1994

[51] Int. Cl.$^6$ ........................................ C09C 1/04
[52] U.S. Cl. ................. 106/417; 106/23 R; 106/464; 106/469; 106/493; 106/494; 106/495; 106/496; 106/497; 106/498; 106/500; 106/504
[58] Field of Search ..................... 106/464, 417, 106/493, 494, 49.5, 496, 497, 498, 500, 504, 469, 23 R

[56] References Cited

U.S. PATENT DOCUMENTS

| 3,087,828 | 4/1963 | Linton | 106/417 |
|---|---|---|---|
| 3,087,829 | 4/1963 | Linton | 106/417 |
| 3,844,810 | 10/1974 | Pollard | 106/452 |
| 4,056,402 | 11/1977 | Guzi, Jr. | 106/501 |
| 4,227,936 | 10/1980 | Osswald et al. | 106/504 |
| 4,370,270 | 1/1983 | Bock et al. | 540/141 |
| 4,517,320 | 5/1985 | Bäbler et al. | 523/215 |
| 4,801,702 | 1/1989 | Bäbler | 540/144 |
| 5,074,918 | 12/1991 | Bäbler | 106/493 |
| 5,084,573 | 1/1992 | Bäbler et al. | 546/56 |
| 5,095,122 | 3/1992 | Bugnon et al. | 548/453 |
| 5,190,585 | 3/1993 | McCrae et al. | 106/493 |
| 5,298,076 | 3/1994 | Bäbler | 106/498 |
| 5,347,014 | 9/1994 | Bäbler | 548/453 |
| 5,352,280 | 10/1994 | McKay | 106/494 |

FOREIGN PATENT DOCUMENTS

| 0220617 | 5/1987 | European Pat. Off. . |
|---|---|---|
| 0278633 | 8/1988 | European Pat. Off. . |
| 0362129 | 4/1990 | European Pat. Off. . |
| 03672365 | 5/1990 | European Pat. Off. . |
| 0416395 | 3/1991 | European Pat. Off. . |
| 0554776 | 8/1993 | European Pat. Off. . |
| 4037735 | 6/1992 | Germany . |
| 4211560 | 10/1993 | Germany . |
| 4225031 | 2/1994 | Germany . |
| 9311194 | 6/1993 | WIPO . |

*Primary Examiner*—Mark L. Bell
*Assistant Examiner*—Scott L. Hertzog
*Attorney, Agent, or Firm*—George R. Dohmann

[57] ABSTRACT

Disclosed is a process for coloring high-molecular-weight coatings and ink systems which comprises uniformly dispersing an effective pigmenting amount of a stir-in pigment in the coating or ink system; wherein the stir-in pigment is an organic pigment crude consisting essentially of non-platelet-shaped particles having an average particle size of from 0.5 to 25 μm and/or a pigment composition consisting essentially of an organic pigment having an average particle size of from 0.01 to 25 μm and inorganic filler pigment.

7 Claims, No Drawings

5,584,922

1

STIR-IN ORGANIC PIGMENTS

SUMMARY

This application relates to a method of coloring high-molecular-weight organic material with organic stir-in pigments and stir-in pigment compositions containing an organic pigment and an inorganic filler pigment.

BACKGROUND

In general, after being mixed into an aqueous or solvent-borne resin system, an organic pigment must be further dispersed prior to its final application. This additional dispersion step generally requires the use of milling equipment such as bead mills. Since this additional dispersion step is both time consuming and costly, the elimination of this step by using pigments that are adequately dispersed during the mixing step, herein referred to as stir-in pigments, is a great advantage.

A number of effect pigments are stir-in pigments which can be added to a coating or ink system without an additional dispersion step. In this application, the expression "effect pigment" means inorganic or organic pigments which show metallic, pearlescent and/or silky-luster effects. Such effect pigments are generally inorganic pigments such as metallics, like aluminum, $TiO_2$-coated mica pigments, platelet graphite and platelet molybdenum disulfide. Other effect pigments are prepared by coating a flaky crystalline form of a substrate with a small amount of a dyestuff or pigment, for example, a metal oxide coated mica. In addition, the effect pigments include certain platelet-shaped organic pigments, such as platelet copper phthalocyanine and those described in U.S. Pat. No. 5,084,573, U.S. Pat. No. 5,095,122, and U.S. Pat. No. 5,347,014. However, no non-platelet-shaped organic stir-in pigments are described.

U.S. Pat. No. 5,298,076 discloses the use of carbazole dioxazine crude of particular particle size and specific surface area as a multi-colored effect pigment for use in a variety of applications, including as a stir-in pigment. However, this publication does not suggest that other pigment crudes could be utilized as stir-in pigments.

The present invention relates to the general discovery that organic pigments having particles with an average particle size within a specific range are useful as stir-in pigments. The invention further relates to the discovery that the range is somewhat broader if the organic pigment is combined with an inorganic filler in a pigment composition.

Since the effect pigments that can be used as stir-in pigments are generally used in conjunction with very small particle size transparent organic pigments in the preparation of effect coatings, an additional dispersion step is necessary to prepare such coatings due to the presence of the aggregated small particle size organic pigment. However, if the effect pigment is used in conjunction with a stir-in organic pigment or pigment composition of the present invention, the costly additional dispersion step is avoided.

The inventive pigments and pigment compositions have an additional advantage over the small particle size organic pigments in coating and ink systems because relatively increased concentrations of the inventive pigments and pigment compositions do not adversely effect the viscosity behavior and gloss of the coating or ink system. Thus, the inventive pigments and pigment compositions are formulated into coating and ink systems using reduced amounts of organic solvents.

2

In addition, the inventive pigments and pigment compositions exhibit an excellent flop effect and in certain cases a silky effect. The term "flop effect" is generally used in this application to describe an effect wherein different color shades or hues are observed when viewing a pigmented object from different viewing angles.

Thus, the inventive pigments and pigment compositions are valuable because they are utilized as stir-in pigments, have excellent rheological and gloss properties and demonstrate an excellent flop effect.

DETAILED DESCRIPTION

This invention relates to a method of coloring a high-molecular-weight organic material, which comprises uniformly dispersing an effective pigmenting amount of a stir-in pigment in the high-molecular-weight organic material by mixing the stir-in pigment into a suspension or solution of the high-molecular-weight organic material in the absence of a subsequent milling step; wherein the stir-in pigment is an organic stir-in pigment which is a pigment crude consisting essentially of non-platelet-shaped pigment particles having an average particle size in the range from 0.5 µm to 25 µm, which pigment crude is not carbazole dioxazine; or wherein the stir-in pigment is a pigment composition which comprises from 0.1 to 50 percent by weight of an inorganic filler pigment and from 50 to 99.9 percent by weight of an organic pigment, wherein the organic pigment consists essentially of particles having an average particle size in the range of from 0.01 µm to 25 µm.

The stir-in pigments of this invention possess outstanding dispersability properties. This is believed to be due to the large pigment particle size and/or the presence of the large particle size inorganic filler pigment as well as the drying and micropulverization processes described below. Thus, the pigments disperse easily when used as stir-in pigments.

Since the organic stir-in pigments and pigment compositions of this invention are simply added and stirred into a suspension or solution of the high-molecular-weight organic material, the inventive stir-in pigments avoid the costly energy and time consuming dispersion process that is normally required to uniformly disperse pigments in a coating or ink system. In general, the mixing simply involves blending the stir-in pigment into the solution or suspension of the high-molecular-weight organic material until a uniform dispersion is achieved. The mixing is advantageously carded out by stirring the resulting pigment-resin suspension for from about 5 minutes to about 3 hours, preferably for from 10 to 30 minutes, by stirring methods known in the art.

Since this invention is based on the discovery that the particle size of the pigment is critical to its utility as a stir-in pigment, the present method is a general method applicable with any organic pigment or pigment crude of the proper particle size.

Especially suitable classes of pigments and pigment crudes include the azo, azomethine, methine, anthraquinone, phthalocyanine, perinone, perylene, diketopyrrolopyrrole, thioindigo, iminoisoindoline, iminoisoindolinone, quinacridone, flavanthrone, indanthrone, anthrapyrimidine and quinophthalone pigments; in particular the diketopyrrolopyrrole, quinacridone, phthalocyanine, indanthrone or iminoisoindolinone pigments.

Notable pigments useful in the present process are those pigments identified in The Color Index, including—quinacridone pigments: C.I. Pigment Red 202, C.I. Pigment Violet 19, C.I. Pigment Red 122; the perylene pigment: C.I. Pigment Red 179; the azo condensation pigments: C.I. Pigment Red 170, C.I. Pigment Red 144, C.I. Pigment Brown 23; the isoindolinone pigments: C.I. Pigment Orange 61, C.I. Pigment Yellow 109, C.I. Pigment Yellow 110; the diketopyrrolopyrrole pigments: C.I. Pigment Red 254, C.I. Pigment Red 255, C.I. Pigment Orange 71; the copper phthalocyanine pigment: C.I. Pigment Blue 15; and the anthraquinone pigments: C.I. Pigment Blue 60, C.I. Pigment Red 177 and C.I. Pigment Yellow 147. The present methods and compositions preferably utilize the pigment crude corresponding to the pigments identified above.

The stir-in pigments of this invention are prepared by known synthesis and/or pigment conditioning processes. However, they are preferably used in the pigment crude form; pigment crude meaning the form obtained from the last synthetic step. Pigments of the proper particle size and shape for use in the present process are prepared by drying the pigment presscake by methods known in the art. Preferably, the presscake of the pigment crude is tray or spray dried. Subsequently, depending on the pigment particle size, the dried pigment, in particular the tray-dried pigment, is optionally micropulverized, for example with hammer mills or air-jet pulverizers.

The organic stir-in pigment of the present invention is a pigment crude which preferably has an average particle size in the range from 1 µm to 15 µm. The range from 1.5 µm to 10 µm is especially suitable for the organic stir-in pigment. The term "average particle size" is used to indicate that the mean of the longest dimension of at least 50 percent of the particles are within the specified size range.

The organic stir-in pigment is non-platelet-shaped. The expression "platelet-shaped" means thin, flat, flaky particles which are oblong, circular or square and have a length and width, or in the case of a circular or oval particle, a diameter or long and short diameters, of from 0.5 to 25 µm, and a thickness preferable for the organic stir-in pigment of the invention to consist essentially of irregular, cubic, needle or bar shaped particles. Bar-shaped means that the particle is generally rectangular with a length to width ratio of 2 or above and a thickness that is greater than one-tenth of the longest dimension.

In addition to the stir-in organic pigments, the present process also relates to the use of pigment compositions as stir-in pigments. The pigment compositions comprise an inorganic filler pigment and an organic pigment having an average particle size in the range from 0.01 µm to 25 µm. The organic pigment preferably has an average particle size in the range from 0.1 µm to 3 µm. Based on the average particle size given above, it is clear that the organic pigment is used in the form of a pigment crude or a conditioned pigment.

In general, the pigment compositions comprise from 50 to 99.9 percent by weight of the organic pigment and from 0.1 to 50 percent of the inorganic filler pigment. Especially suitable pigment compositions comprise from 65 to 95 percent by weight of the organic pigment and from 5 to 35 percent of the inorganic filler pigment.

The expression "inorganic filler pigment" means a substantially transparent inorganic pigment. For example, mica, kaolin, talc and natural or synthetic silicas, eg. glass, are well-known inorganic filler pigments that are suitable for use in the pigment compositions of the present invention.

Transparent micas are especially suitable for use as the inorganic filler pigment. Of the micas, muscovite, phlogopite, biolite and synthetic micas are most suitable.

Muscovite mica and talc are highly suitable inorganic filler pigments.

The inorganic filler pigment is preferably used in its natural form but can include treated transparent inorganic filler pigments, for example a mica treated with a metal oxide. Mica pigments coated with $TiO_2$, $ZrO_2$, $Fe_2O_3$ and $Cr_2O_3$ are highly suitable treated inorganic filler pigments.

In general, the inorganic filler pigment has primary pigment particles having a flaky shape and an average particle size of 0.5 µm to 200 µm, especially from 1 µm to 60 µm, in particular from 2 µm to 351 µm.

The pigment compositions are generally prepared by conventional methods, for example, by mixing the individual components in the desired ratio as dry powders, or, preferably, by blending the aqueous presscake of the organic pigment together with the inorganic filler pigment in water and then isolating the pigment composition by filtration. The pigment composition is then dried, for example by spray, tray, spin flash or Venuleth drying, preferably spray or tray drying, optionally followed by micropulverization or air-jet pulverization.

The present compositions consist of the organic pigment and the inorganic filler pigment, or the pigment compositions additionally contain customary additives. Such customary additives include light stabilizers and texture improving agents.

Useful light stabilizers are U.V. light absorbers, for example, benzotriazoles or hindered amine light stabilizers (HALS).

Texture improving agents are especially useful as an additional component which can improve the properties of the stir-in pigment compositions. Suitable texture improving agents include fatty acids having at least 12 carbon atoms, and amides, esters or salts of fatty acids. Typical fatty acid derived texture improving agents include fatty acides such as stearic acid or behenic acid, and fatty amines like lauryl amine, or stearylamine. In addition, polyols, like aliphatic 1,2-diols, and epoxidized soya bean oil, waxes, resin acids and resin acid salts are suitable texture improving agents. Rosin acids and rosin acid salts are especially suitable texture improving agents.

The texture improving agent is incorporated into the composition before, during or after blending the organic pigment and the inorganic filler pigment. The texture improving agent is preferably incorporated into the present composition in an amount of from 0.05 to 20 percent, most preferably 1 to 10 percent, by weight, based on the combined weights of the inorganic filler pigment and the organic pigment.

Pigments compositions which include a texture improving agent are effectively prepared, for example, by a process which comprises (a) blending an aqueous suspension containing the inorganic filler pigment and the organic pigment with a water-soluble rosin acid salt; (b) precipitating an insoluble salt of the rosin acid by adding a divalent or trivalent metal salt to the suspension, and (c) then isolating a presscake of the pigment composition by filtering the suspension. The presscake obtained is then spray-dried or tray-dried and then optionally micropulverized to form the pigment composition of the present invention.

Notable pigment compositions are those which comprise a muscovite mica as the inorganic filler pigment and a diketopyrrolopyrrole or a quinacridone pigment or pigment crude, or a pigment solid solution as described in U.S. Pat. No. 4,783,540 or U.S. Pat. No. 4,810,304, as the organic pigment.

Especially notable pigment compositions contain muscovite mica and a diketopyrrolopyrrole of the formula:

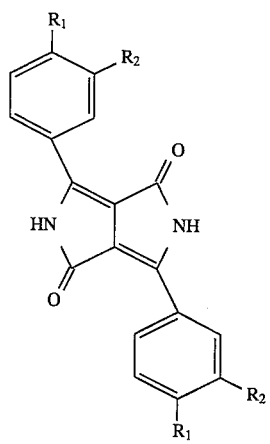

wherein $R_1$ is hydrogen, chlorine, bromine, cyano, methyl, ethyl, t-butyl or phenyl and $R_2$ is hydrogen, chlorine, methyl or cyano.

Other notable pigment compositions contain muscovite mica and a quinacridone pigment selected from the group consisting of C.I. Pigment Red 202, C.I. Pigment Red 122 or C.I. Pigment Violet 19 or the corresponding pigment crude.

Generally, an effective pigmenting amount of the stir-in pigment is incorporated into the high-molecular-weight organic material to be pigmented. An effective pigmenting amount is any amount suitable to provide the desired color in the high-molecular-weight organic material. In particular, the stir-in pigments are used in an amount of 0.01 to 30% by weight, preferably 0.1 to 10% by weight, based on the weight of the high-molecular-weight organic material to be pigmented.

The pigmented, high-molecular-weight organic materials which are colored according to the present process are useful in a variety of applications. For example, the high-molecular-weight organic material can be used for the pigmentation of lacquers, inks and enamel coating compositions. The pigmented high-molecular-weight organic materials prepared according to the present invention are particularly useful for preparing automotive coating paints.

The high-molecular-weight organic materials which are colored according to the present process are, for example, cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

High-molecular-weight organic materials which are useful for heat-curable coatings or cross-linking, chemically-reactive coatings, are also colored according to the present process. The pigmented, high-molecular-weight organic materials prepared according to the present process are especially useful in stoving finishes which contain the customary binders and which are reactive at high temperature. Examples of the pigmented, high-molecular-weight organic materials which are used in coatings include acrylic, alkyd, epoxy, phenolic, melamine, urea, polyester, polyurethane, blocked isocyanate, benzoguanamine or cellulose ester resins, or combinations thereof. The pigmented, high-molecular-weight organic materials prepared according to the present process are also useful as air-drying or physically-drying coatings, for example, conventional lacquers such as those used in the cosmetics industry as nail varnishes, for example nitrocellulose lacquers.

The present process is particularly suitable for preparing coatings conventionally employed in the automobile industry, especially in acrylic/melamine resin, alkyd/melamine resin or thermoplastic acrylic resin systems, as well as in aqueous based coating systems.

Coatings and ink systems colored by the present process possess excellent heat, light and weatherfastness, as well as bleed and overspraying fastness properties.

Due to the excellent dispersability behavior of the stir-in pigments of this invention, uniform distribution of pigment particles throughout the entire application media is achieved. The stir-in pigments show excellent rheological behavior.

The present stir-in pigments are used alone or in the presence of other pigments or dyes. It is especially suitable to color the high-molecular-weight organic material with the present stir-in pigments in conjunction with an effect pigment.

The color effect and shade are varied by varying the kind of the effect pigment and the concentrations of the effect pigment and the stir-in pigment of the present invention. Particularly striking effect shades are generated by using the stir-in pigments with known transparent titanium dioxide-coated mica pigments.

The pigment compositions are particularly suitable for preparing interesting high-chroma solid enamel shades. Exceptionally pure high-chroma shades are created using diketopyrrolopyrrole pigments like C.I. Pigment Red 254 (3,6-di(4-chlorophenyl)-1,4diketopyrrolo [3,4-c]pyrrole) or C.I. Pigment Red 255 (3,6-diphenyl)-1,4-diketopyrrolo [3,4-c]pyrrole) or quinacridone pigments like the beta and gamma form of the unsubstituted quinacridone as organic pigment component. The resulting enamel possesses high opacity, saturation and excellent light and weatherfastness properties. Especially useful pigment compositions contain mica as the inorganic filler pigment and C.I. Pigment Red 254 as the organic pigment.

The following examples further describe the embodiments of the invention, but do not limit the scope of the invention. In the examples, all parts are by weight unless otherwise indicated.

EXAMPLE 1A 500 grams of an aqueous pigment presscake containing bis-(4,5,6,7-tetrachloro- isoindolin-1-on-3-ylidene)-phenylene-1,4-diamine pigment crude is tray dried in an oven at 80°–100° C. The dried pigment is micropulverized in an assemble micropulverizer (The Bantam, type G-90 from American Marietta Company) using a 0.047 inch round hole screen and a rotating speed of 7000 RPM, yielding 130 grams yellow isoindolinone pigment consisting of primary pigment particles having a bar-shaped pigment form, wherein the particles have a length in the range of 0.5 to 2.7 µm as determined by electron microscopy.

EXAMPLES 1B to 1D

These examples illustrate the incorporation of the isoindoline pigment prepared in Example 1A into an acrylic/melamine base/clearcoat system.

Resin solutions are prepared as follows:

I. Solid Clear Solution

The following ingredients are stirred together to provide a "solid clear solution" containing 57.53% solids:

1171 grams of a nonaqueous dispersion resin (NAD-resin),
 719.1 grams of a melamine resin,
 269.4 grams of a solvent mixture of aliphatic and aromatic hydrocarbons (SOLVESSO 100),
 597.6 grams of polyester urethane resin,
 125.1 grams of a catalyst solution, and
 120 grams of butanol.

II. Metallic Clear Solution

The following ingredients are stirred together to provide a "metallic clear solution" containing 59.2% solids:

3.0 grams of a nonaqueous dispersion resin,
 786.2 grams of melamine resin,
 144.6 grams of xylene,
 65.6 grams of UV Screener Solution,
 1.6 grams of acrylourethane resin,
 89.0 grams of catalyst solution, and
 90.0 grams of methanol.

III. Mica dispersion

The following ingredients are stirred together to provide a mica dispersion containing 27.9% pearlescent mica pigment and a total solid content of 69.1% solids:

1.1 grams of bright white mica, EXTERIOR MEARLIN from The Mearl Corp.,
 315.0 grams of NAD-resin, and
 180.0 grams of acrylourethane resin.

IV. Stir-in pigment dispersion

The following ingredients are stirred together in an ½ pint can:

66.0 grams of acrylourethane resin,
 14.5 grams of AB-dispersant, and
 58.1 grams of SOLVESSO 100.
 26.4 grams of the isoindolinone pigment obtained according Example 1A are then added to the above resin/solvent-mixture as a stir-in pigment. The yellow pigment dispersion is stirred at slow to medium speed for 15 to 20 minutes, providing a homogeneous non-viscous stir-in pigment dispersion containing 16.0% yellow isoindolinone pigment, a total solid content of 48% solids in a pigment to binder ratio of 0.5.

V. $TiO_2$-dispersion

A $TiO_2$ dispersion is prepared by mixing the following ingredients in a quart can:

604.1 grams of a $TiO_2$ pigment,
 129.8 grams of acrylourethane resin, and
 161.1 grams of SOLVESSO 100.

1 pint of ½" ceramic balls are then added. The dispersion is then milled for 24 hours. The white pigment dispersion is separated from the balls yielding a "$TiO_2$-dispersion" containing 67.5% pigment with a total solid contents of 77.4% solids.

EXAMPLE 1B

Masstone Color Shade:

53.5 grams "stir-in pigment dispersion IV" and 76.5 grams "solid clear solution I" are combined with stirring. The yellow resin/pigment dispersion is sprayed onto a panel twice in a 1.5 minute interval as basecoat. After 2 minutes, clearcoat resin is sprayed twice at 1 ½ minute intervals onto the basecoat. The sprayed panel is then flashed with air in a flash cabinet for 30 minutes and then "baked" in an oven at 250° F. for 30 minutes, yielding a reddish-yellow colored panel, with excellent weatherability. A microscopic evaluation shows a homogeneous distribution of the pigment particles in the coating system.

EXAMPLE 1 C

An 80/20 white mica shade is prepared by mixing the following ingredients:

46.1 grams "stir-in pigment dispersion IV"
 6.6 grams "mica dispersion III"
 6.9 grams NAD-resin,
 70.4 grams "metallic clear solution II"

The yellow pigment/pearlescent mica/resin dispersion is sprayed onto a panel followed by a clearcoat as described in Example 1B. A yellow color effect paint which shows a reddish flop and excellent weatherability is obtained. The pigment particles are homogeneously distributed in the coating system. Additionally, the paint shows a high gloss.

EXAMPLE 1D

A 50/50 white mica shade is prepared by mixing the following ingredients:

29.9 grams "stir-in pigment dispersion IV",
 17.1 grams "mica dispersion III",
 6.4 grams acrylourethan resin,
 3.6 grams NAD resin,
 73.0 grams "metallic clear solution II".

The yellow pigment/pearlescent mica/resin dispersion is sprayed onto a panel followed by a clearcoat as described in Example 1B. A yellow color effect paint which shows a strong reddish flop and excellent weatherability and gloss properties is obtained. The pigment particles are homogeneously distributed in the coating system.

EXAMPLE 1E

A 10/90 tint shade is prepared by mixing the following ingredients:

7.7 grams "stir-in pigment dispersion IV",
 16.4 grams "TiO2-dispersion V",
 14.3 grams acrylourethane resin,
 61.6 grams "solid clear solution I"

The yellow pigment/TiO2/resin dispersion is sprayed onto a panel followed by a clearcoat as described in Example 1B, yielding a high gloss yellow tinted panel in which the pigment particles are homogeneously dispersed.

EXAMPLE 2A 500 grams of an aqueous presscake containing 2,9-dichloroquinacridone crude is tray dried in an oven at 80–100° C. The dried presscake is micropulverized in an assemble micropulverizer (The BANTAM, type G-90 from American Marietta Company) using a 0.062 inch roundhole screen and a rotating speed of 7000 RPM to yield 280 grams of a magenta pigment consisting of primary pigment particles having a needle prismatic pigment particle form, wherein the length of the pigment particles is in the range from 0.5 to 3.5 μm as determined by electron microscopy.

EXAMPLE 2B

The procedure described in Example 1B is repeated using the 2,9-dichloroquinacridone obtained according to Example 2A as the pigment in the "stir-in pigment dispersion IV". The procedure yields a strongly colored magenta panel, which shows a fine silky appearance and in which the pigment is homogeneously dispersed in the coating system.

EXAMPLE 2C

The procedure described in Example 1C is repeated using the 2,9-dichloroquinacridone obtained according to Example 2A as pigment in the "stir-in pigment dispersion IV". The procedure yields a magenta-colored effect paint showing a fine bluish lustre effect. The 2,9-dichloroquinacridone pigment and the pearlescent mica pigment are homogeneously distributed in the coatings system.

EXAMPLE 2D

The procedure described in Example 1D is repeated using the 2,9-dichloroquinacridone obtained according to Example 2A as pigment in the "stir-in pigment dispersion IV". The procedure yields a magenta-colored effect paint which shows a very strong bluish flop.

EXAMPLE 3A 200 grams of a large particle size crude β-copper phthalocyanine pigment is micropulverized twice in an assemble micropulverizer (The BANTAM, type G90 from American Marietta Company) using a 0.020 inch round hole screen and a rotator speed of 14,000 RPM; yielding a pigment consisting of primary pigment particles having a needle prismatic shape with a length in the range of 1 to 15 μm.

EXAMPLE 3B

The procedure of Example 1B is repeated using the copper phthalocyanine pigment obtained according to Example 3A as a pigment in the "stir-in pigment dispersion IV". The procedure yields a strongly colored dark-blue panel with a slight violet flop and a very fine silky appearance. The pigment is homogeneously dispersed in the coating system.

EXAMPLE 3C

The procedure described in Example 1C is repeated using the copper phthalocyanine pigment obtained according to Example 3A as pigment in the "stir-in pigment dispersion IV". The procedure yields a blue-colored effect paint showing strong flop from blue to greenish blue. The coating has an excellent gloss and outstanding weatherability.

EXAMPLE 3D

The procedure described in Example 1D is repeated using the copper phthalocyanine pigment obtained according to Example 3A as the pigment in the "stir-in pigment dispersion IV". The procedure yields a blue-colored effect paint which shows a strong flop from reddish to greenish blue. The coating has an excellent gloss and outstanding weatherability properties.

EXAMPLE 4

The procedure in Example 1C is repeated using an indanthrone blue pigment crude with primary pigment particles having a needle shape particle form, wherein the needles have a length in the range from 0.2 to 5 μm, as a pigment in the "stir-in pigment dispersion IV". The procedure yields a strongly blue-colored effect paint with excellent gloss and weatherability.

EXAMPLE 5

The procedure in Example 1B is repeated using the crude of anthraquinone pigment, C.I. Pigment Yellow 147, consisting of primary pigment particles having a bar shaped form, wherein the bars have a length in the range of 0.2 to 4.51 μm determined by electron microscopy, as a pigment in the "stir-in pigment dispersion IV". The procedure yields a strongly-colored yellow panel. The pigment is homogeneously distributed in the paint coating system.

EXAMPLE 6A 250 ml water, 100 grams aqueous presscake containing 35 grams 3,6-di (4-chlorophenyl)-1,4-diketopyrrolo[3,4-c]-pyrrole pigment crude consisting of primary pigment particles having an isometric shape with a particle size in the range from 0.2 to 0. μm determined by electron microscopy, 15 grams of a muscovite mica with an average particle size of 18.5 μm and 1.5 grams of a sodium salt of a rosin (DRESINATE X from HERCULES Corp.) dissolved in 40 ml of water are blended together to form a homogeneous suspension. 0.5 grams of calcium chloride dissolved in 30 ml water are added to the stirred suspension, precipitating the calcium salt of the rosin. The resulting uniform red pigment suspension is filtered. The presscake is washed with water until salt-free and subsequently tray dried in an oven at 80–100° C. The procedure yields 51 grams of a pigment composition containing 2.9% Ca salt of rosin, 29.0% mica and 68.1% diketopyrrolopyrrole pigment.

The pigment composition is micropulverized in an assemble micropulverizer (The BANTAM, type G90 from American Marietta Company) using a 0.039 inch round hole screen and a rotating speed of 7000 RPM.

EXAMPLE 6B

The procedure described in Example 1B is repeated using the pigment composition obtained according to Example 6A as the pigment in the "stir-in pigment suspension IV". A uniform pigment resin dispersion having excellent viscosity is obtained. The pigment dispersion is sprayed onto panels as described in Example 1B, yielding a highly saturated strong red-colored panel with excellent weatherability.

EXAMPLE 6C

The procedure described in Example 1C is repeated using the pigment composition obtained according to Example 6A as the pigment in the "stir-in pigment dispersion IV". The procedure yields a red-colored, highly saturated effect paint. The coating has excellent gloss properties and outstanding weatherability. The pigments are homogeneously dispersed in the coating systems.

EXAMPLE 6D

The procedure described in Example 1D is repeated using the pigment composition obtained according to Example 6A as a pigment in the "stir-in pigment dispersion IV". The procedure yields a highly saturated, red-colored effect paint, which shows a strong flop from red to bluish red. The coating exhibits excellent gloss and shows outstanding weatherability.

EXAMPLE 7A

The procedure of Example 6A is repeated using an aqueous pigment presscake containing 39 grams 3,6-di(4-chlorophenyl)-1,4-diketopyrrolo-[3,4-c]-pyrrole pigment crude and 11 grams of a muscovite mica, yielding 50.6 grams of a pigment composition containing 2.9% Ca salt of rosin, 21.4% mica and 75.7% diketopyrrolopyrrole pigment.

EXAMPLE 7B

The procedure described in Example 6C is repeated using the pigment composition obtained according to Example 7A as the pigment in the "stir-in pigment dispersion IV". The procedure yields a red-colored, highly saturated effect paint of similar good properties.

EXAMPLE 8A

The procedure of Example 6A is repeated using an aqueous pigment presscake containing 35 grams γ-quinacridone pigment (MONASTRAL Red Y RT-759-D from CIBA-GEIGY Corp.) consisting of primary pigment particles having an isometric shape with a particle size in the range from 0.1 to 0.6μm. The procedure yields a pigment composition containing 2.9% Ca salt of rosin, 29.0% mica and 68.1% quinacridone pigment.

EXAMPLE 8B

The procedure described in Example 1B is repeated using the pigment composition obtained according to Example 8A as pigment in the "stir-in pigment suspension IV". The procedure yields a uniformly colored red panel with excellent weatherability.

EXAMPLE 8C

The procedure of Example 1D is repeated using the pigment composition obtained according to Example 8A as the pigment in the "stir-in pigment dispersion IV". The procedure yields a highly saturated bluish-red colored effect paint which shows a bluish flop.

In addition to the embodiments described above, numerous variations of these embodiments can be made in accordance with this invention.

I claim:

1. A stir-in pigment composition which compromises
   (a) from 0.1 to 50 parts by weight of an organic filler pigment having an average particle size in the range from 1 to 60 micrometers,
   (b) from 50 to 99.9 parts by weight of an organic pigment having an average particle size in the range of from 0.1 micrometers to 3 micrometers, and
   (c) from 0.05 to 20 parts by weight of a texture-improving agent; wherein the sum of the parts by weight of the inorganic filler pigment and the organic pigment is 100 and wherein said composition is capable of being uniformly dispersed in a high molecular weight organic material without a dispersion milling step.

2. A stir-in pigment composition of claim 1 wherein the organic pigment is C.I. Pigment Red 254, C.I. or Pigment Red 255.

3. A stir-in pigment composition of claim 1 wherein the texture-improving agent is a water-insoluble salt of rosin acid.

4. A stir-in pigment composition of claim 1 wherein the inorganic filler pigment is mica or talc.

5. A stir-in pigment composition of claim 4 wherein the organic pigment is a diketopyrrolopyrrole pigment, a quinacridone pigment or a solid solution thereof.

6. A stir-in pigment composition of claim 5 wherein the organic pigment is the beta or gamma form of quinacridone.

7. A stir-in pigment composition of claim 5 wherein the inorganic filler pigment has an average particle size in the range from 2.0 micrometers to 35 micrometers.

* * * * *

UNITED STATES PATENT AND TRADEMARK OFFICE
CERTIFICATE OF CORRECTION

PATENT NO. : 5,584,922
DATED : DECEMBER 17, 1996
INVENTOR(S) : FRIDOLIN BÄBLER

It is certified that error appears in the above-indentified patent and that said Letters Patent is hereby corrected as shown below:

Column 12, line 8, should read:

-- (a) from 0.1 to 50 parts by weight of an inorganic filler --.

Signed and Sealed this

Seventh Day of October, 1997

Attest:

BRUCE LEHMAN

Attesting Officer

Commissioner of Patents and Trademarks